United States Patent
Koch et al.

(10) Patent No.: US 11,042,280 B2
(45) Date of Patent: Jun. 22, 2021

(54) HARVESTING MACHINE WITH VISUALIZATION SYSTEM

(71) Applicant: AGCO Corporation, Duluth, GA (US)

(72) Inventors: Jared Koch, Hesston, KS (US); Jay Leininger, Hesston, KS (US); Gerald R. Johnson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/978,687

(22) PCT Filed: Mar. 4, 2019

(86) PCT No.: PCT/IB2019/051723
§ 371 (c)(1),
(2) Date: Sep. 5, 2020

(87) PCT Pub. No.: WO2019/171246
PCT Pub. Date: Sep. 12, 2019

(65) Prior Publication Data
US 2020/0396899 A1     Dec. 24, 2020

Related U.S. Application Data

(60) Provisional application No. 62/638,785, filed on Mar. 5, 2018.

(51) Int. Cl.
*G06F 3/0484* (2013.01)
*A01D 41/127* (2006.01)
(Continued)

(52) U.S. Cl.
CPC ..... *G06F 3/04847* (2013.01); *A01D 41/1272* (2013.01); *A01D 41/1276* (2013.01);
(Continued)

(58) Field of Classification Search
CPC .... G06F 3/0484; G06F 3/04847; G06F 3/048; A01D 41/127; A01D 41/1271;
(Continued)

(56) References Cited

U.S. PATENT DOCUMENTS 4,360,998 A      11/1982 Somes
5,775,072 A  *   7/1998 Herlitzius .......... A01D 41/1276
                                                        460/4
(Continued)

FOREIGN PATENT DOCUMENTS

EP            1470749 A1 * 10/2004 .......... A01D 41/127
WO       2015/028437 A1    3/2015
(Continued)

OTHER PUBLICATIONS

UK Intellectual Property Office, Search Report for related UK Application No. GB 1804601.1, dated Sep. 24, 2018.
(Continued)

*Primary Examiner* — Thomas B Will
*Assistant Examiner* — Joan D Misa

(57) ABSTRACT

A graphical user interface (60) for a combine harvester (10) includes, in a first portion (62) of the user interface, a graphical representation (66, 70) of an amount of material passing through a threshing system (22) at multiple positions along a longitudinal direction of the combine harvester, and a graphical representation (68, 72) of an amount of material passing through a cleaning system (42) at multiple positions along the longitudinal direction of the combine harvester. The user interface further includes, in a second portion (64) of the user interface, a graphical representation (74, 78) of an amount of material passing through the threshing system (22) at a plurality of locations along a lateral axis of the combine harvester, and a graphical representation (76, 80) of an amount of material passing through the cleaning system
(Continued)

(42) at a plurality of locations along the lateral axis of the combine harvester.

10 Claims, 7 Drawing Sheets

(51) Int. Cl.
| | | |
|---|---|---|
| *A01F 12/18* | (2006.01) | |
| *A01F 12/26* | (2006.01) | |
| *G06F 3/048* | (2013.01) | |
| *A01D 75/18* | (2006.01) | |

(52) U.S. Cl.
CPC ............ *A01D 75/18* (2013.01); *A01F 12/184* (2013.01); *A01F 12/26* (2013.01); *G06F 3/048* (2013.01)

(58) Field of Classification Search
CPC ............ A01D 41/1272; A01D 41/1276; A01D 75/18; A01D 75/182; A01D 75/187; A01F 12/26; A01F 12/184; A01F 12/448
See application file for complete search history.

(56) References Cited

U.S. PATENT DOCUMENTS

| | | | | |
|---|---|---|---|---|
| 5,978,720 A * | 11/1999 | Hieronymus | ........ | A01D 41/127 340/438 |
| 6,863,604 B2 * | 3/2005 | Behnke | ................ | A01D 41/127 460/6 |
| 6,869,355 B2 * | 3/2005 | Bernhardt | .......... | A01D 41/1273 460/1 |
| 6,932,697 B2 * | 8/2005 | Baumgarten | ...... | A01D 41/1276 460/1 |
| 7,337,023 B2 * | 2/2008 | Diekhans | ............. | A01D 41/127 700/52 |
| 8,019,517 B2 * | 9/2011 | Boenig | ................ | A01D 41/127 701/50 |
| 8,370,742 B2 * | 2/2013 | Hieronymus | ........ | A01D 41/127 715/702 |
| 8,428,830 B2 * | 4/2013 | Diekhans | ............. | A01D 41/127 701/50 |
| 8,935,060 B2 * | 1/2015 | Baumgarten | ........ | G05B 13/021 701/50 |
| 9,002,594 B2 * | 4/2015 | Wilken | ................. | G05B 11/06 701/50 |
| 9,345,197 B2 * | 5/2016 | Biggerstaff | .......... | A01D 41/127 |
| 9,403,536 B2 * | 8/2016 | Bollin | ................. | G05B 13/021 |
| 9,445,546 B2 * | 9/2016 | May | ................... | A01D 41/1276 |
| 9,629,308 B2 * | 4/2017 | Scholer | ............. | A01D 41/1272 |
| 9,631,964 B2 * | 4/2017 | Gelinske | ................ | G01F 1/662 |
| 9,699,970 B2 * | 7/2017 | Johnson | ............... | A01D 75/282 |
| 9,756,787 B2 * | 9/2017 | Heitmann | ........... | G05B 13/021 |
| 9,968,036 B2 * | 5/2018 | Johnson | ............. | A01D 41/1273 |
| 9,980,433 B2 * | 5/2018 | Duquesne | ............. | A01F 12/444 |
| 10,085,379 B2 * | 10/2018 | Schleusner | .......... | G01S 13/867 |
| 10,104,840 B2 * | 10/2018 | Duquesne | ............ | A01D 41/127 |
| 10,126,929 B2 * | 11/2018 | Baumgarten | ......... | B60K 35/00 |
| 10,318,138 B2 * | 6/2019 | Scholer | ............. | A01D 41/1277 |
| 10,437,243 B2 * | 10/2019 | Blank | .................. | G06F 3/04883 |
| 10,448,569 B2 * | 10/2019 | Baumgarten | ............. | C12C 7/01 |
| 10,481,628 B2 * | 11/2019 | French, Jr. | ........... | A01D 41/127 |
| 10,660,268 B2 * | 5/2020 | Dybro | ..................... | A01F 12/44 |
| 10,716,255 B2 * | 7/2020 | Xu | ........................ | A01D 41/127 |
| 10,721,869 B2 * | 7/2020 | Duquesne | ............ | A01D 75/282 |
| 10,761,711 B2 * | 9/2020 | Koch | .................. | A01D 41/1272 |
| 10,785,910 B2 * | 9/2020 | Vandike | ................ | A01F 12/444 |
| 2005/0137003 A1 * | 6/2005 | Behnke | ............. | A01D 41/1276 460/1 |
| 2005/0143153 A1 * | 6/2005 | Behnke | .............. | A01D 41/1276 460/4 |
| 2014/0053093 A1 * | 2/2014 | Grevinga | ............ | G06F 3/04817 715/769 |
| 2015/0009328 A1 * | 1/2015 | Escher | ............... | A01D 41/1277 348/148 |
| 2015/0080070 A1 | 3/2015 | Johnson et al. | | |
| 2015/0156971 A1 | 6/2015 | May | | |
| 2016/0035319 A1 * | 2/2016 | Koike | ..................... | G09G 5/14 345/634 |
| 2017/0235471 A1 | 8/2017 | Scholer et al. | | |
| 2017/0248453 A1 * | 8/2017 | Herlitzius | ............... | A01F 12/32 |
| 2017/0251600 A1 | 9/2017 | Anderson et al. | | |
| 2018/0329618 A1 * | 11/2018 | Wieckhorst | ......... | G06F 3/04847 |
| 2019/0183045 A1 * | 6/2019 | Rademacher | ........ | A01D 41/127 |
| 2019/0350132 A1 * | 11/2019 | Issac | .................. | A01D 41/127 |

FOREIGN PATENT DOCUMENTS

| | | |
|---|---|---|
| WO | 2017/040261 A1 | 3/2017 |
| WO | 2017/075011 A1 | 5/2017 |
| WO | 2017/075036 A1 | 5/2017 |

OTHER PUBLICATIONS

European Patent Office, International Search Report for related International Application No. PCT/IB2019/051723, dated Jun. 11, 2019.

* cited by examiner

HARVESTING MACHINE WITH VISUALIZATION SYSTEM

FIELD

Embodiments of the present invention relate to user interfaces for agricultural machines. More particularly, embodiments of the present invention relate to user interfaces for harvester crop processing systems.

BACKGROUND

For many decades, self-propelled combine harvesters have been used by farmers to harvest a wide range of crops including cereals, maize and oilseed rape. Typically, a combine harvester cuts the crop material, threshes the grain (or seed) therefrom, separates the grain from the straw, and cleans the grain before storing in an on-board tank. Straw and crop residue are ejected from the rear of the machine.

The crop processor of a combine harvester comprises threshing and separating systems. The separating system is traditionally based upon one of two well-established systems. In a first known system straw walkers are used to "walk" the crop stream rearwardly in the combine wherein agitation caused by this movement causes the grain to fall through an integrated grate while the straw residue falls from the rear and out of the combine. In the second alternative system cylindrical rotors are mounted within the combine longitudinally and enclosed by rotor cages wherein crop fed in at the front travels rearwardly in an axially spiral motion due to interacting crop engaging elements fitted to the rotor tube and guide vanes fitted on the inside of the rotor cage. The cylindrical rotors can provide a threshing and separating action, or a separating action only. Separated grain falls through a grate in the cage whilst the straw residue is conveyed rearwardly and out of the machine.

The process for cleaning grain in combine harvesters has not changed fundamentally for many decades. The cleaning system has directed therethrough a cleaning airstream which is typically generated by a cross-flow or centrifugal fan located in front of the cleaning shoe. As a mix of grain kernels, chaff, tailings and straw is passed over one or more oscillating sieves, the cleaning airstream serves to blow the lighter material in a generally rearward direction over the sieves and out of the rear of the machine. The grain is generally heavier and/or smaller than the material other than grain (MOG) in the mix and passes through the sieves.

The above section provides background information related to the present disclosure which is not necessarily prior art.

SUMMARY

A combine harvester according to embodiments of the invention comprises a threshing system for threshing and separating crop material; a cleaning system for separating grain from chaff, the cleaning system being positioned to collect crop material falling from the threshing system; a plurality of threshing system sensors for detecting an amount of material passing from the threshing system to the cleaning system, at least two of the threshing system sensors being spaced apart along a longitudinal axis of the combine harvester and at least two of the rotor sensors being spaced apart along a lateral axis of the combine harvester; and a plurality of cleaning system sensors for detecting an amount of material passing through the cleaning system, at least two of the cleaning system sensors being spaced apart along the longitudinal axis of the combine harvester and at least two of the cleaning system sensors being spaced apart along the lateral axis of the combine harvester.

The combine harvester further comprises one or more computing devices configured to receive data from the threshing system sensors and from the cleaning system sensors, and use the data to generate a graphical user interface. The graphical user interface includes, in a first portion of the user interface, a graphical representation of an amount of material passing through the threshing system at multiple positions along a longitudinal direction of the combine harvester, and a graphical representation of an amount of material passing through the cleaning system at multiple positions along the longitudinal direction of the combine harvester. The graphical user interface further includes, in a second portion of the user interface, a graphical representation of an amount of material passing through the threshing system at a plurality of locations along a lateral axis of the combine harvester, and a graphical representation of an amount of material passing through the cleaning system at a plurality of locations along the lateral axis of the combine harvester.

In another embodiment of the invention, the combine harvester the computing device is configured to present the first portion of the user interface and the second portion of the user interface simultaneously and in a manner such that the graphical representation of the amount of material passing through the threshing system in the first portion of the user interface is visually aligned with the graphical representation of the amount of material passing through the threshing system in the second portion of the user interface, and such that the graphical representation of the amount of material passing through the cleaning system in the first portion of the user interface is visually aligned with the graphical representation of the amount of material passing through the cleaning system in the second portion of the user interface.

In some embodiments of the invention, the combine harvester includes a computing device configured to present information in the second portion of the user interface according to a user-selected position of a visual marker in the first portion of the user interface. In response to an input received from a user, the computing device changes the location of the visual marker in the first portion of the graphical user interface and updates the information in the second portion of the graphical user interface to correspond to the new location of the visual marker.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein:

FIG. 1 is a perspective view of a combine harvester constructed according to principles of the present invention.

FIG. 2 presents a perspective view of a threshing system and a cleaning system of the combine harvester of FIG. 1, illustrating the placement of sensors configured and arranged to detect crop material flow through concaves and a cleaning shoe of the processor.

Figure 1:
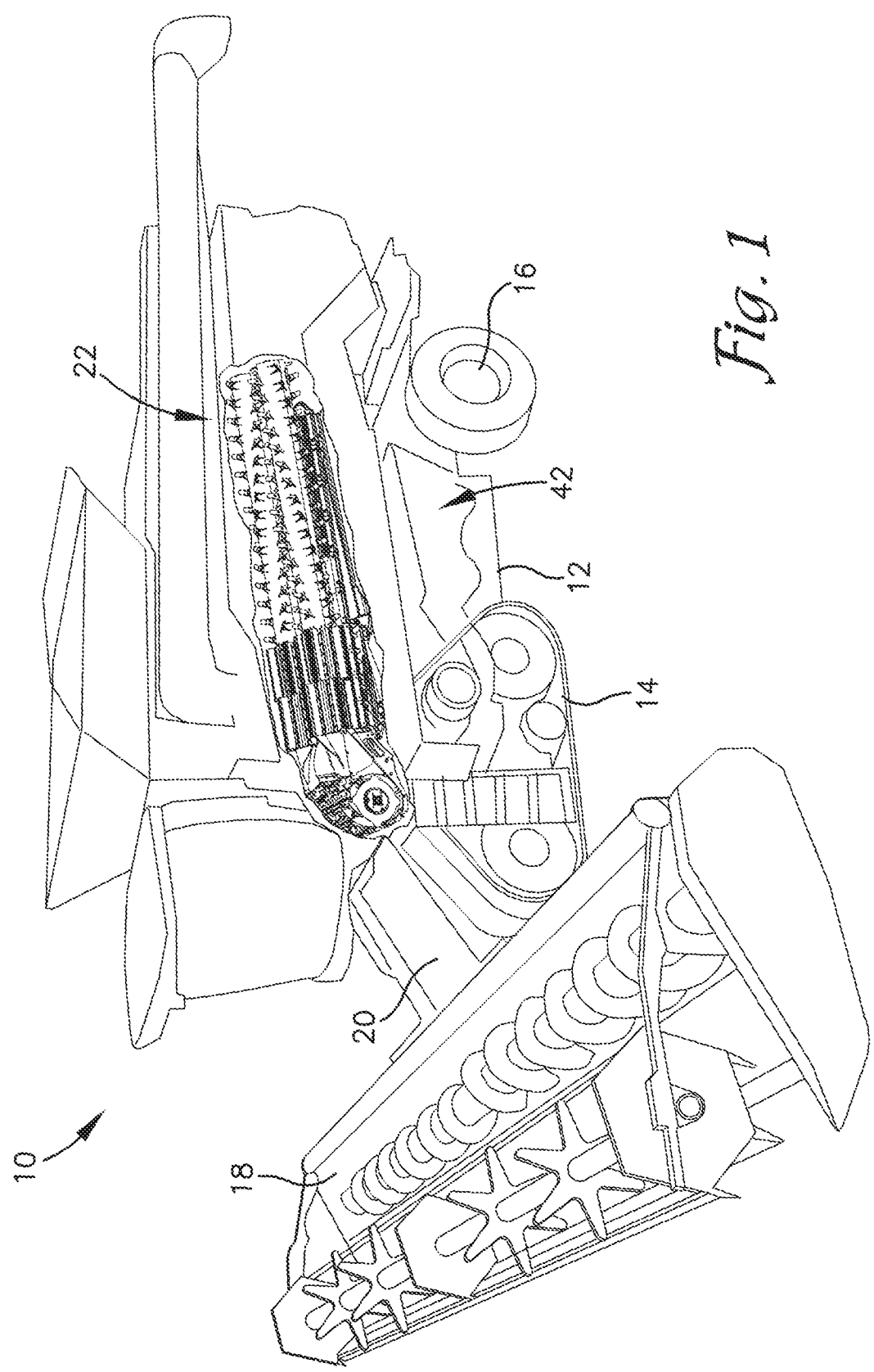

The drawing figures do not limit the present invention to the specific embodiments disclosed and described herein. The drawings are not necessarily to scale, emphasis instead being placed upon clearly illustrating the principles of the invention.

DESCRIPTION

The following description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following description is, therefore, not to be taken in a limiting sense.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
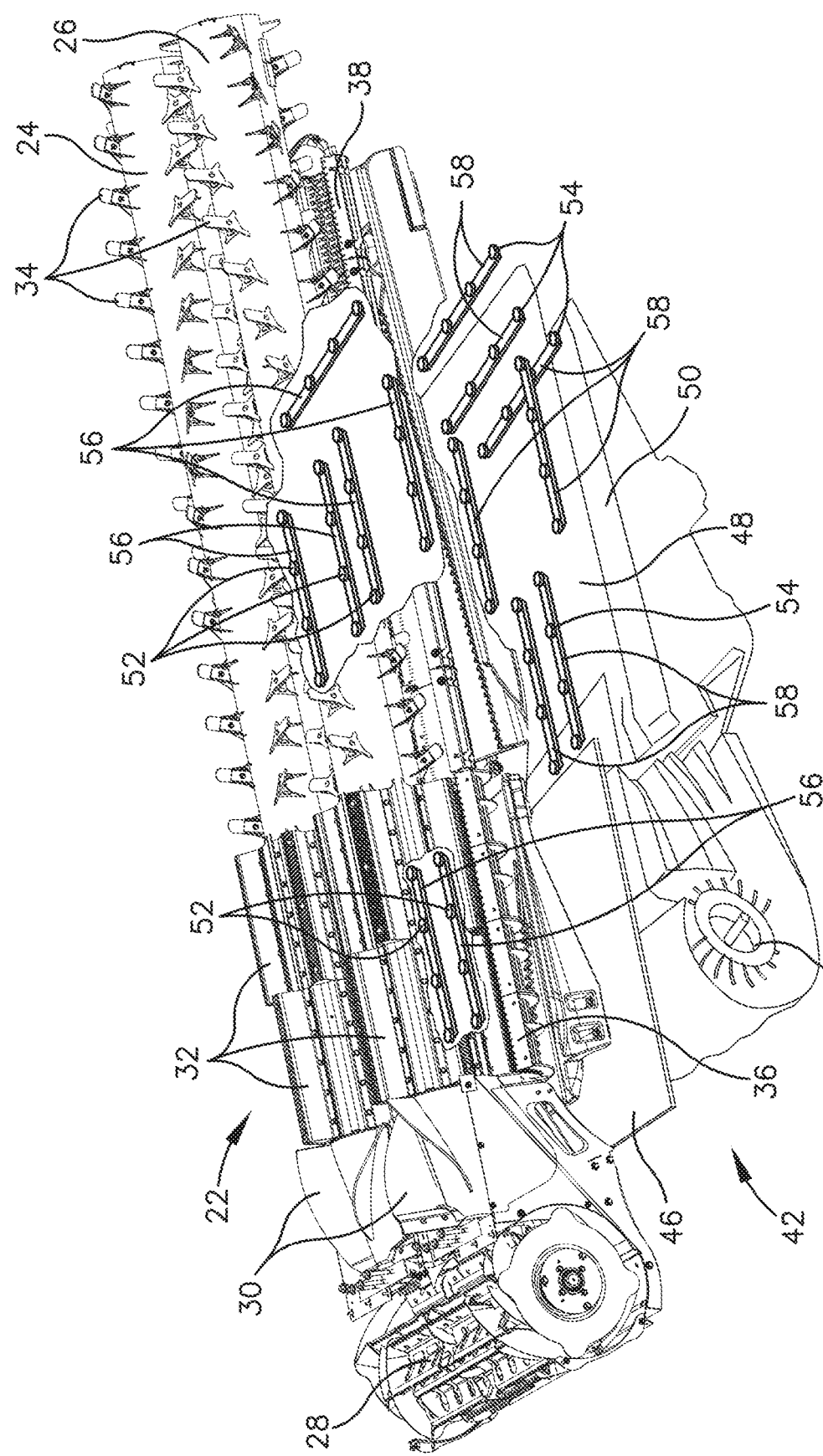
Figure 3:
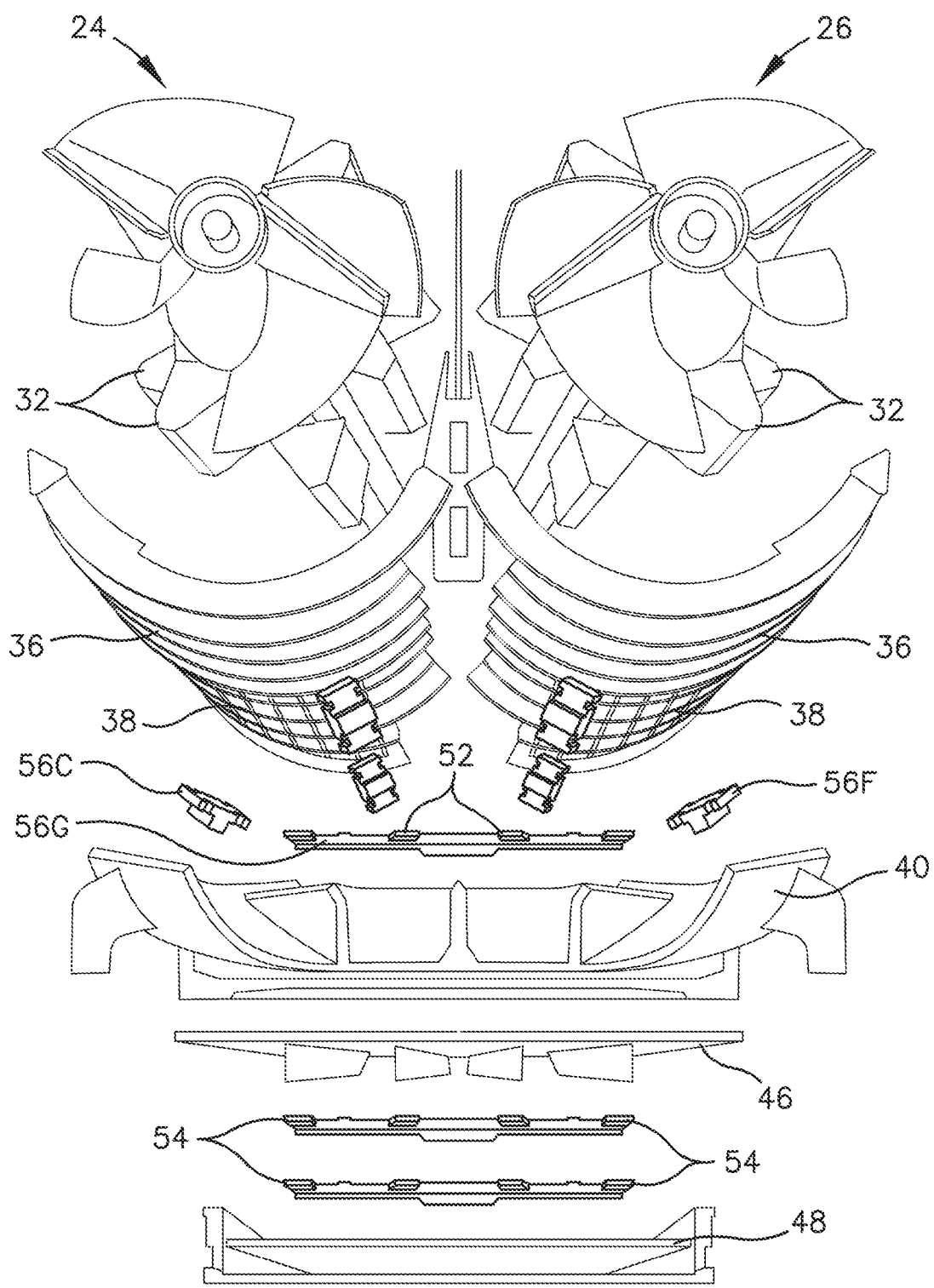
FIG. 3 is an exploded view of various components of the systems of FIG. 2.

With initial reference to FIGS. 1-3, a combine harvester 10 includes a frame 12, front tracks 14 and steerable rear wheels 16. A header 18 is detachably supported on the front of a feederhouse 20 which is pivotable about a transverse axis to lift and lower the header 18 in a conventional manner.

The combine 10 is driven in a forward direction across a field of standing crop in a known manner. The header 18 serves to cut and gather the crop material before conveying such into the feederhouse 20 and elevator housed therein. At this stage the crop stream is unprocessed. It should be understood that combine harvesters are employed to harvest a host of different crops including cereal, rice, corn and grass seed. The following description will make reference to various parts of the cereal crop stream but it should be understood that this is by way of example only and does not by any means limit the applicability of the invention to harvester other harvesting crops.

The cut crop stream is conveyed rearwardly from the feederhouse 20 to a threshing system 22. The threshing system 22 includes a pair of axial flow threshing and separating rotors 24, 26 which are arranged side by said and are fed at their front end by a feed beater 28. The axial flow rotors 24, 26 serve to thresh the crop stream in a front "threshing" region, separate the grain therefrom in a rear "separating" region, and eject the straw residue through the rear of the combine harvester 10 either directly onto the ground in a windrow or via a straw chopper. Each rotor 24, 26 includes a plurality of blades 30 near a front end for moving crop material from the feed beater 28 rearward along the rotor, and a plurality of rasp bars 32 proximate the blades 30. Each rotor 24, 26 further includes a plurality of fingers 34 forming spiral-shaped rows along an outer surface thereof for moving crop material toward a rear portion of the machine as the threshing and separating occurs.

The threshing system 22 also includes one or more concaves 36 and one or more grates 38 associated with each rotor 24, 26. Each concave 36 is located proximate the underside of one of the rotors and allows the separated material to fall by gravity to a cleaning system 42 located below the threshing system 22. A return pan 40 comprises a tray-like structure and serves to catch crop material falling from the concaves 36 and grates 38 forwardly to a front edge where the grain falls into the cleaning system 42. At this point the crop material may include a mixture of grain kernels, chaff, unthreshed tailings and shorter straw. The residue crop material, predominantly straw, exits the combine harvester 10 at the rear where it is spread or placed in a windrow.

The cleaning system 42 separates grain from chaff according to known principles and includes a fan 44 for moving air through the cleaning system, a stratification pan 46, a chaffer 48 and a sieve 50. The cleaning system ejects residue through the rear of the machine while the clean grain is conveyed by a (not shown) elevator to an onboard storage tank. For completeness, the combine 10 includes an unloading system which includes an unloading auger shown in part in FIG. 1.

FIGS. 2 and 3 illustrate a plurality of threshing system sensors 52 placed at various locations in or near the threshing system 22 to detect an amount of material falling from the threshing system 22, and a plurality of cleaning system sensors 54 placed at various locations in or near the cleaning system 42 to detect an amount of material passing through the cleaning system 42. The sensors 52, 54 may be mass acoustic detection sensors placed immediately beneath the concaves as well as within or beneath the cleaning assembly. The sensors are spaced apart along a longitudinal direction and along a lateral direction of the combine harvester 10 so that an amount of material falling through the concaves and the cleaning assembly can be determined at various points along the longitudinal axis and along the lateral axis of the machine.

Figure 4:
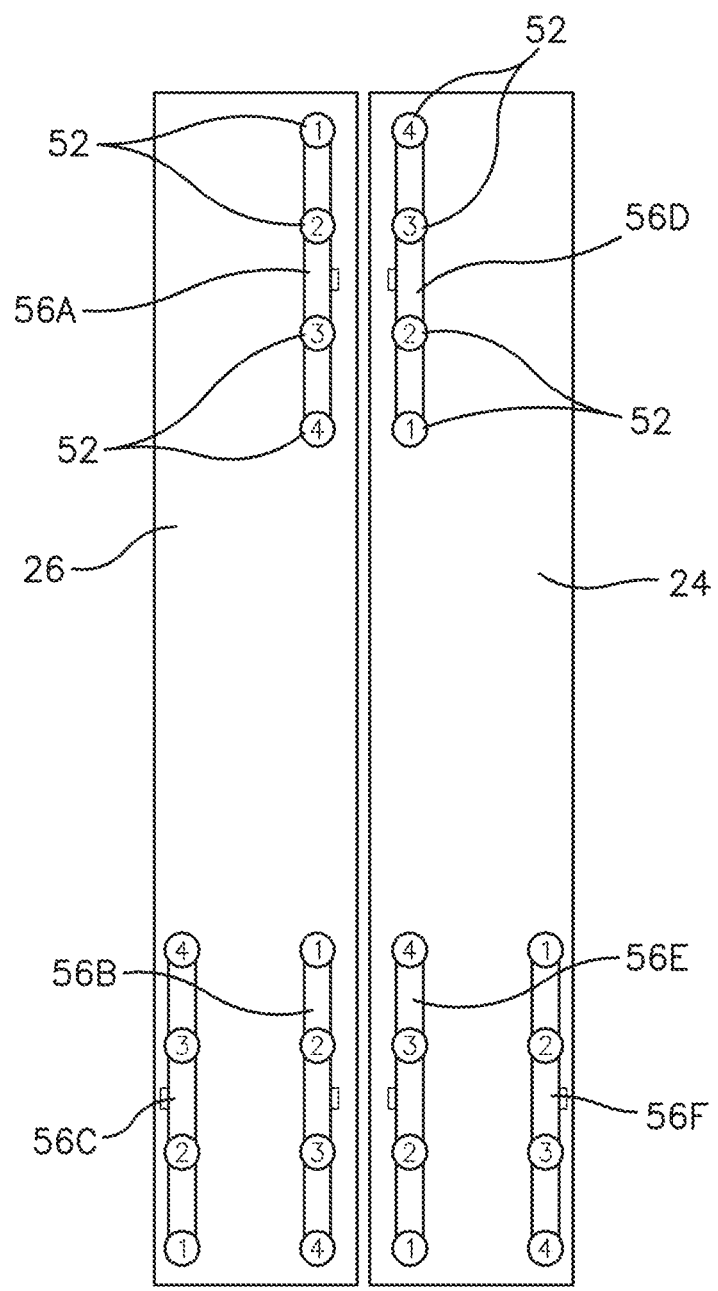
FIG. 4 is a schematic diagram illustrating exemplary locations of some of the sensors of FIG. 2.

FIG. 4 is a diagram illustrating, in plan view, the relative locations of various of the threshing system sensors 52. The sensors 52 are placed on multiple sensor bars 56A-F. Two of the sensor bars 56A, 56D are placed near a forward end of the threshing system 22 while four of the sensor bars 56B, 56C, 56E, 56F are placed near a rearward end of the threshing system 22. Each of the sensor bars 56 includes four of the sensors 52 approximately evenly spaced along the bar. Three of the sensor bars 56A, 56B, 56C are associated with one of the rotors 24, with the sensor bar 56A being placed near a forward end of the rotor 24 and two of the sensor bars 56B, 56C being placed near a rearward end of the rotor 24. The two sensor bars 56B, 56C placed near the rearward end of the rotor 24 are also spaced apart laterally or along a lateral axis of the combine harvester 10. Similarly, three of the sensor bars 56D, 56E, 56F are associated with the other rotor 26, with the sensor bar 56D being placed near a forward end of the rotor 26 and two of the sensor bars 56B, 56C being placed near a rearward end of the rotor 24. The two sensor bars 56E, 56F placed near the rearward end of the rotor 26 are also spaced apart laterally or along the lateral axis of the combine harvester 10. Spacing the sensors 52 along longitudinal and lateral axes of the combine harvester 10 enables the system to determine an amount of material passing from the threshing system 22 at various locations and to present to the user information about material distribution in a graphical user interface. Not depicted in FIG. 4 (but illustrated in FIGS. 2 and 3) is another sensor bar 56G positioned rearward of the bars 56B, 56C, 56E and 56F. While the sensor bars 56A-F are oriented generally along the longitudinal axis of the combine harvester 10, the sensor bar 56G is oriented generally along the lateral axis of the combine harvester 10.

Similarly, the cleaning system 42 includes multiple sensor bars 58, each sensor bar 58 holding a plurality of the cleaning system sensors 54. In particular, four sensor bars 58 are oriented generally along the longitudinal axis of the combine harvester 10 and three sensor bars 58 are oriented generally along the lateral axis of the combine harvester 10. The sensor bars 58 are placed below the stratification pan 46

FIGS. 5-10 illustrate a graphical user interface 60 that presents a graphical representation of the data collected by the sensors 52, 54. The graphical user interface 60 presents a visualization of crop material passing from the threshing system 22 and passing through the cleaning system 42, including a distribution of crop material along a longitudinal direction of the combine harvester 10 and along a lateral direction of the combine harvester 10.

A first portion 62 of the user interface 60 presents a graphical representation of an amount of material passing through the threshing system 22 at multiple positions along a longitudinal direction of the combine harvester 10. The first portion 62 of the user interface 58 also presents a graphical representation of an amount of material passing through the cleaning system 42 at multiple positions along the longitudinal direction of the combine harvester 10. A second portion 64 of the user interface 60 presents a graphical representation of an amount of material passing through the threshing system 22 at a plurality of locations along a lateral axis of the combine harvester. The second portion 64 of the user interface 60 also presents a graphical representation of an amount of material passing through the cleaning system 42 at a plurality of locations along the lateral axis of the combine harvester 10.

Both the first portion 62 and the second portion 64 of the user interface 60 present crop material load and distribution information within or as part of a graphical representation of the combine harvester 10. The first portion 62 of the user interface 60 includes a graphical depiction 66 of a portion of the threshing system 22 along a longitudinal direction and a graphical depiction 68 of a portion of the cleaning system 42 along a longitudinal direction. Associated with the graphical depiction 66 of the portion of the threshing system 22 is a status graph 70 that indicates an amount of material falling from the threshing system 22. The status graph 70 is curved and is generated using data collected from the sensors 52. As illustrated, the status graph 70 is lowest near a middle of the graphical depiction 66 of the threshing system 22 indicating that more crop material is falling from the threshing system 22 at or near the middle and less is falling from the threshing system 22 near the ends thereof.

Associated with the graphical depiction 68 of the portion of the cleaning system 42 is a status graph 72 that indicates an amount of material falling from the cleaning system 42. The status graph 72 is curved and is generated using data collected from the sensors 54. As illustrated, the status graph 72 is lowest near a forward portion of the graphical depiction 68 of the cleaning system 42 indicating that more crop material is falling from the cleaning system 42 at or near a forward portion of the cleaning system 42 and less is falling from the cleaning system 42 near a rearward portion thereof.

The second portion 64 of the user interface 60 includes a graphical depiction 74 of a portion of the threshing system 22 along a lateral direction of the combine harvester 10 and a graphical depiction 76 of a portion of the cleaning system 42 along a lateral direction of the combine harvester 10. Associated with the graphical depiction 74 of the portion of the threshing system 22 is a plurality of bar graphs 78 that indicate amounts of material falling from the threshing system 22 at multiple locations along the lateral direction. As illustrated, the bar graph 78B on the right is lower than the bar graph 78A on the left, indicating that more crop material is falling from the right side of the threshing system 22 than on the left side of the threshing system 22. In this embodiment of the invention the combine harvester 10 has two rotors, so the bar graph 78A on the left generally indicates crop material falling from the left rotor while the bar graph 78B on the right generally indicates crop material falling from the right rotor. It will be appreciated, however, that this system may be used on a combine harvester 10 with a single rotor, wherein the bar graphs 78 may indicate an amount of crop material falling from a left side of the rotor and an amount of crop material falling from a right side of the rotor.

Associated with the graphical depiction 76 of the portion of the cleaning system 42 is a plurality of bar graphs 80 that indicate amounts of material falling from the cleaning system 42 at multiple locations along the lateral direction. As illustrated, the bar graph 80B on the right is lower than the bar graph 80A on the left, indicating that more crop material is falling from the right side of the cleaning system 42 than on the left side of the cleaning system 42.

Figure 5:
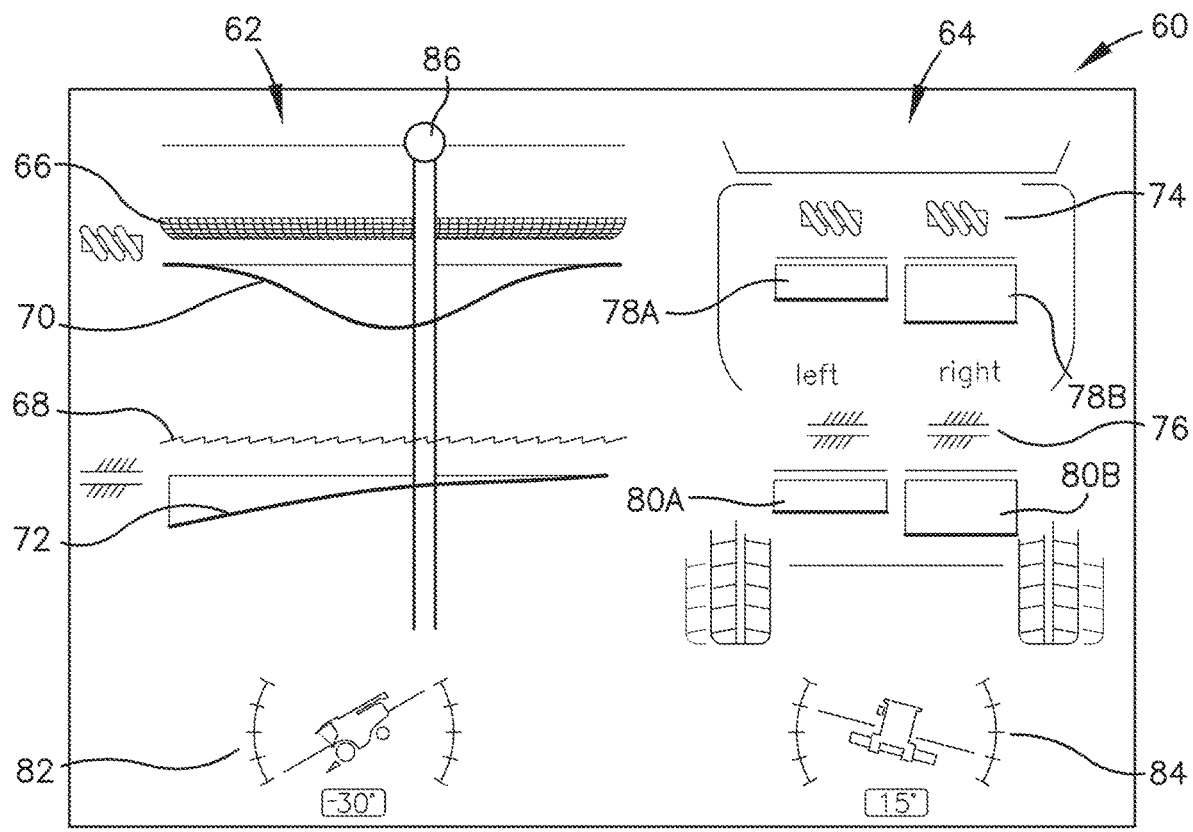
FIG. 5 is an exemplary graphical user interface presenting data collected by the sensors of FIG. 2.

The graphs 70, 72, 78, 80 may be updated in real time or near real time using data collected by the sensors 52, 54. In this manner the graphs 70, 72, 78, 80 can be animations with constant or near constant movement to reflect actual, current loading and distribution of crop material in the threshing system 22 and the cleaning system 44. Furthermore, and as illustrated in FIG. 5, the first portion 62 of the user interface 60 and the second portion 64 of the user interface 60 are presented simultaneously and in a manner such that the graphical representation of the amount of material passing through the threshing system 22 in the first portion 62 of the user interface 60 is visually aligned with the graphical representation of the amount of material passing through the threshing system 22 in the second portion 64 of the user interface 60, and such that the graphical representation of the amount of material passing through the cleaning system 42 in the first portion 62 of the user interface 60 is visually aligned with the graphical representation of the amount of material passing through the cleaning system 42 in the second portion 64 of the user interface 60. This manner of graphically presenting information allows the operator to quickly and easily assess how crop material is distributed front to rear as well as side to side in the threshing and cleaning systems of the combine harvester 10. A pitch indicator 82 illustrates the pitch of the combine harvester 10 and a roll indicator 84 indicates a roll of the combine harvester 10.

The first portion 62 of the user interface 60 includes a visual marker 86 indicating a location along the longitudinal direction of the combine harvester 10 corresponding to the distribution information presented in the second portion 64 of the user interface 60. The visual marker 86 is moveable by the user between a forward location of the graphical depiction 66 (toward the left in the illustrations) and a rearward location of the graphical depiction 66 (toward the right in the illustrations). When the visual marker 86 is located forward (toward the left) the loading and distribution information depicted on the second portion 64 of the user interface 60 is generated using data from sensors 52, 54 located forward on the combine harvester 10. When the visual marker 86 is located rearward (toward the right) the loading and distribution information depicted on the second portion 64 of the user interface 60 is generated using data from sensors 52, 54 located rearward on the combine harvester 10. Similarly, when the visual marker 86 is located in the middle, the loading and distribution information depicted on the second portion 64 of the user interface 60 is generated using data from sensors 52, 54 located in the middle.

Figure 6:
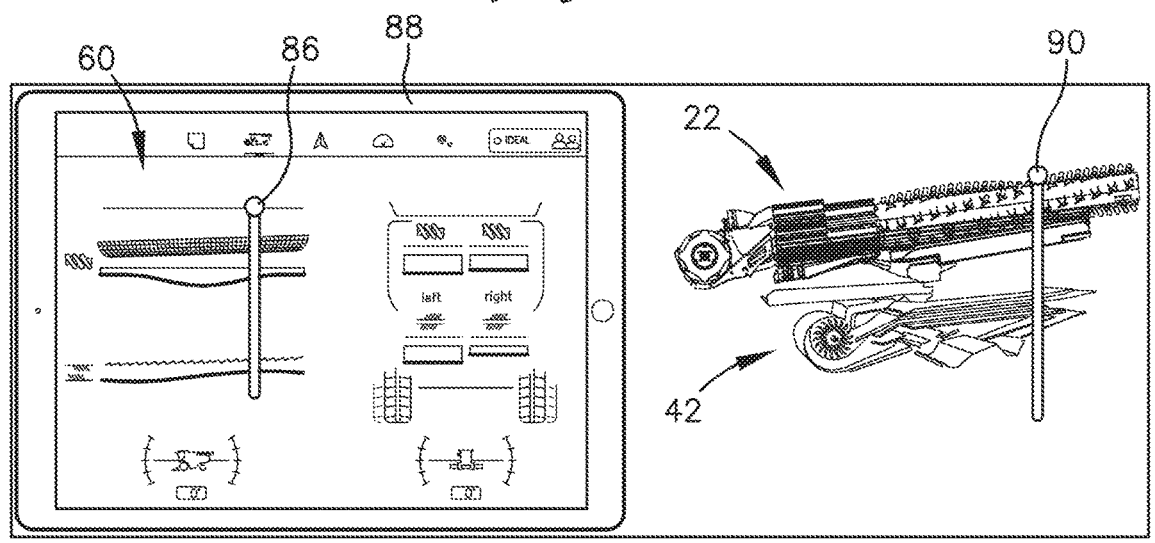
FIGS. 6-10 illustrate the graphical user interface of FIG. 5 and locations on the processor where data presented in various portions of the user interface is collected.
Figure 7:
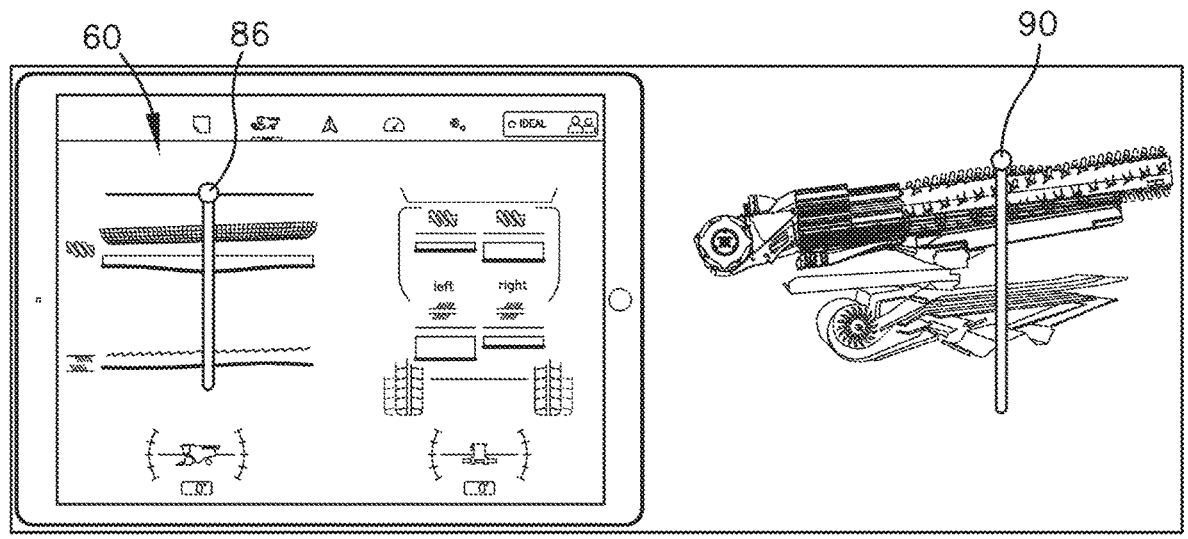
Figure 8:
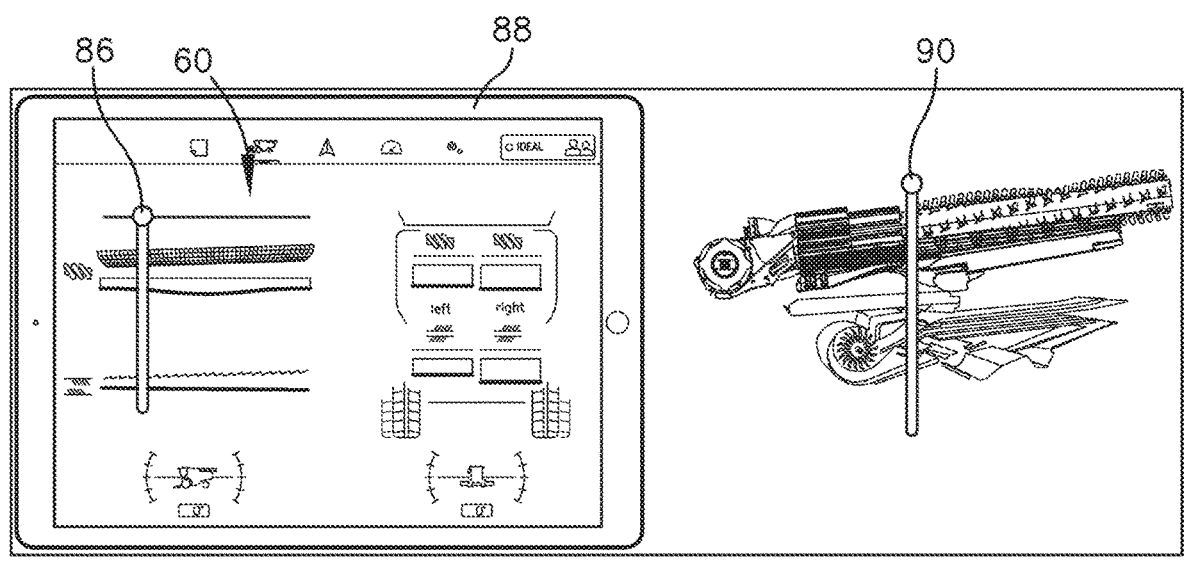

FIG. 6 depicts the user interface 60 on a portable electronic device 88, such as a table computer. If the device 88 has a touchscreen, the user may simply touch the visual marker 86 and drag it left or right to the desired location. To the right in FIG. 6 portions of the threshing system 22 and the cleaning system 44 are depicted, along with an indicator 90 of the location of the threshing system 22 and the cleaning system 44 corresponding to the crop material loading and distribution information presented in the second portion 64 of the user interface 60. FIG. 7 illustrates the user interface 60 with the visual marker 86 moved to a central location along the longitudinal direction, with the indicator 90 showing the corresponding location of the threshing system 22 and the cleaning system 44 corresponding to the crop material loading and distribution information presented in the second portion 64 of the user interface 60. FIG. 8 illustrates the user interface 60 with the visual marker 86 moved to a forward location along the longitudinal direction, with the indicator 90 showing the corresponding location of the threshing system 22 and the cleaning system 44 corresponding to the crop material loading and distribution information presented in the second portion 64 of the user interface 60.

Figure 9:
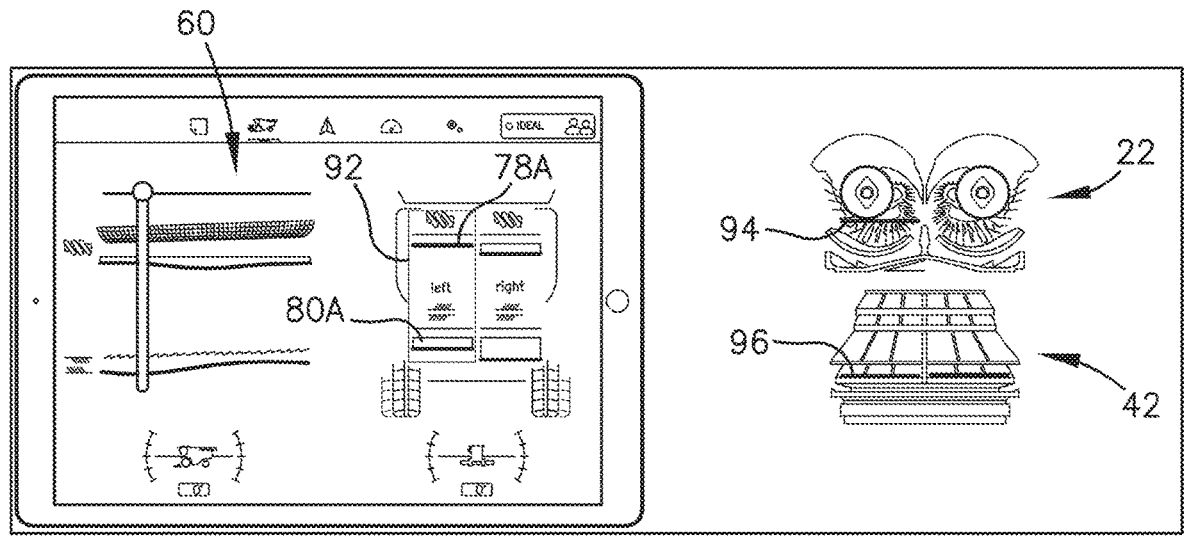
Figure 10:
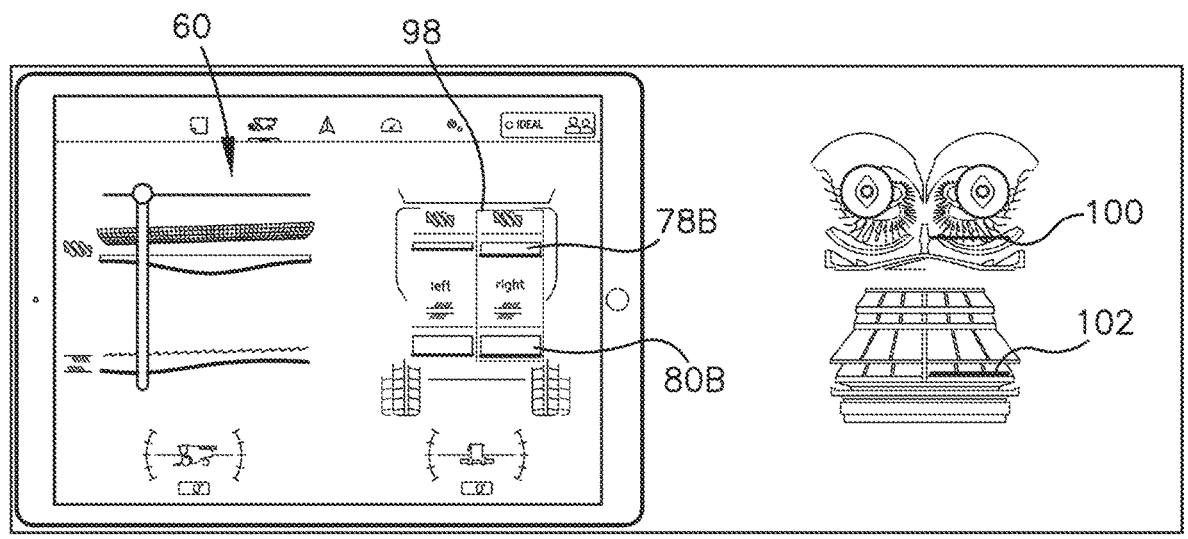

FIG. 9 illustrates that the left bar graphs 78A, 80A, outlined by box 92, correspond to crop material data collected on the left side of the threshing system 22 and the cleaning system 42, as indicated by markers 94, 96, respectively. FIG. 10 illustrates that the right bar graphs 78B, 80B, outlined by box 98, correspond to crop material data collected on the right side of the threshing system 22 and the cleaning system 42, as indicated by markers 100, 102, respectively.

It may be desirable, for example, to operate the combine 10 so that more material passes through the concaves and the cleaning assembly toward a front of the machine than toward a rear of the machine because more material passing through near a rear of the machine may be indicative of grain loss. Similarly, it may be desirable for the operator to see amounts of grain passing through left and right portions of the concaves 22 and the shoe where the machine is operating on a slope and is leaning left or right. In that situation one side or the other may be overloaded.

An advantage of the present invention includes collecting data indicative of processed crop such that the data may be used to generate visual information for the machine operator to inform the machine operator of the status of crop processing at various locations within the machine. Yet another advantage of the present invention is allowing the machine operator to select particular locations within the machine to view a lateral distribution of the processed crop.

Although the invention has been described with reference to one or more embodiments illustrated in the attached drawing figures, it is noted that equivalents may be employed and substitutions made herein without departing from the spirit or scope of the invention. Furthermore, the following claims describe one or more exemplary embodiments of the invention and are not intended to describe all embodiments of the invention or all novel aspects of the invention.

The invention claimed is:

1. A combine harvester, comprising:
   a threshing system for threshing and separating crop material;
   a cleaning system for separating grain from chaff, the cleaning system being positioned to collect crop material falling from the threshing system;
   a plurality of threshing system sensors for detecting an amount of material passing from the threshing system to the cleaning system, at least two of the threshing system sensors being spaced apart along a longitudinal axis of the combine harvester and at least two of the threshing system sensors being spaced apart along a lateral axis of the combine harvester;
   a plurality of cleaning system sensors for detecting an amount of material passing through the cleaning system, at least two of the cleaning system sensors being spaced apart along the longitudinal axis of the combine harvester and at least two of the cleaning system sensors being spaced apart along the lateral axis of the combine harvester;
   one or more computing devices configured to—
      receive data from the threshing system sensors and from the cleaning system sensors, and
      use the data to generate a graphical user interface including—
         in a first portion of the user interface, a graphical representation of an amount of material passing through the threshing system at multiple positions along a longitudinal direction of the combine harvester, and a graphical representation of an amount of material passing through the cleaning system at multiple positions along the longitudinal direction of the combine harvester,
         in a second portion of the user interface, a graphical representation of an amount of material passing through the threshing system at a plurality of locations along the lateral axis of the combine harvester, and a graphical representation of an amount of material passing through the cleaning system at a plurality of locations along the lateral axis of the combine harvester.

2. The combine harvester as set forth in claim 1, the computing device configured to present the first portion of the user interface and the second portion of the user interface simultaneously and in a manner such that the graphical representation of the amount of material passing through the threshing system in the first portion of the user interface is visually aligned with the graphical representation of the amount of material passing through the threshing system in the second portion of the user interface, and such that the graphical representation of the amount of material passing through the cleaning system in the first portion of the user interface is visually aligned with the graphical representation of the amount of material passing through the cleaning system in the second portion of the user interface.

3. The combine harvester as set forth in claim 1, the computing device configured to present information in the second portion of the user interface according to a user-selected position of a visual marker in the first portion of the user interface.

4. The combine harvester as set forth in claim 1, the computing device configured to present a visual marker in the first portion of the graphical user interface, the visual marker indicating a location along the longitudinal direction of the combine harvester corresponding to the information in the second portion of the graphical user interface.

5. The combine harvester as set forth in claim 4, the computing device further configured to—
- in response to an input received from a user, change the location of the visual marker in the first portion of the graphical user interface to a new location, and
- in response to the input received from the user, update the information in the second portion of the graphical user interface to correspond to the new location of the visual marker.

6. The combine harvester as set forth in claim 1, the computing device configured to present, as part of the graphical representation of the combine harvester, an animation of the material passing through the threshing system and the material passing through the cleaning system.

7. The combine harvester as set forth in claim 1, the threshing system including a plurality of rotors oriented parallel with the longitudinal axis of the combine harvester.

8. The combine harvester as set forth in claim 7, the threshing system including a plurality of concaves, each concave being associated with one of the rotors, the threshing system sensors being placed beneath the concaves.

9. The combine harvester as set forth in claim 1, the cleaning system including a stratification pan, a sieve and a chaffer, the cleaning system sensors being located beneath the stratification pan and above the chaffer and the sieve.

10. The combine harvester as set forth in claim 1, the one or more computing devices further configured to generate the graphical user interface such that—
- the first portion of the graphical user interface includes a graphical representation of a portion of the combine harvester and illustrates, as part of the graphical representation of the portion of the combine harvester, the graphical representation of the amount of material passing through the threshing system and the graphical representation of the amount of material passing through the cleaning system, and
- the second portion of the graphical user interface includes a graphical representation of a portion of the combine harvester and illustrates, as part of the graphical representation of the portion of the combine harvester, the graphical representation of the amount of material passing through the threshing system and the graphical representation of the amount of material passing through the cleaning system.

* * * * *